US011640306B2

(12) United States Patent
Murugan et al.

(10) Patent No.: US 11,640,306 B2
(45) Date of Patent: May 2, 2023

(54) COMPUTATIONAL CONFIGURATION AND MULTI-LAYER CLUSTER ANALYSIS

(71) Applicant: HEWLETT PACKARD ENTERPRISE DEVELOPMENT LP, Houston, TX (US)

(72) Inventors: Muthukumar Murugan, Ft. Collins, CO (US); Dinesh Venkatesh, Andover, MA (US); Yan Burdett, Andover, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 380 days.

(21) Appl. No.: 17/084,552

(22) Filed: Oct. 29, 2020

(65) Prior Publication Data

US 2022/0137985 A1    May 5, 2022

(51) Int. Cl.
| | |
|---|---|
| G06F 9/445 | (2018.01) |
| G06N 20/00 | (2019.01) |
| G06F 8/65 | (2018.01) |
| G06F 16/28 | (2019.01) |
| H04L 9/40 | (2022.01) |
| G06F 21/32 | (2013.01) |

(52) U.S. Cl.
CPC ............ *G06F 9/44505* (2013.01); *G06F 8/65* (2013.01); *G06F 16/285* (2019.01); *G06N 20/00* (2019.01); *G06F 21/32* (2013.01); *H04L 63/0236* (2013.01); *H04L 63/1425* (2013.01)

(58) Field of Classification Search
CPC .. H04L 63/1425; H04L 63/0236; G06F 21/32
See application file for complete search history.

(56) References Cited

U.S. PATENT DOCUMENTS

| | | | |
|---|---|---|---|
| 9,172,608 B2 | 10/2015 | Zeyliger et al. | |
| 2016/0352764 A1* | 12/2016 | Mermoud | H04L 63/1425 |
| 2017/0279829 A1* | 9/2017 | Vasseur | H04L 63/0236 |
| 2017/0310691 A1* | 10/2017 | Vasseur | H04L 63/1425 |
| 2018/0204116 A1 | 7/2018 | Evans et al. | |

(Continued)

OTHER PUBLICATIONS

Ana Klimovic et al, Selecta: Heterogeneous Cloud Storage Configuration for Data Analytics, Proceedings of the 2018 USENIX Annual Technical Conference (USENIX ATC '18), Jul. 11-13, 2018; 16 Pgs, USENIX, Boston, MA, USA.

(Continued)

*Primary Examiner* — Barbara B Anyan
(74) *Attorney, Agent, or Firm* — Sheppard Mullin Richter & Hampton LLP

(57) ABSTRACT

Systems and methods are provided for computationally configuring computing devices and performing multi-layer cluster analysis. For example, the system can identify multiple layers of clusters of devices (e.g., shared hardware configuration, shared application configuration, number of applications, etc.) in a large scale infrastructure environment automatically. For each layer of the clusters of devices, parameters of these devices are provided to a machine learning model to produce an objective function (e.g., minimum number of devices, utilization under 80%, etc.), whose output can be provided to a datacenter operator or other user in the large scale infrastructure environment so they can make further configuration changes to the devices in each cluster.

20 Claims, 7 Drawing Sheets

(56) References Cited

U.S. PATENT DOCUMENTS

2019/0033945 A1    1/2019  Magcale et al.
2019/0262721 A1*   8/2019  MacInnes ............ G07F 17/3276
2020/0257785 A1*   8/2020  Li .......................... G06F 21/32

OTHER PUBLICATIONS

Archana Ganapathi et al, A Case for Machine Learning to Optimize Multicore Performance, Retrieved Sep. 15, 2020, 6 Pgs.
Nezih Yigitbasi et al, Towards Machine Learning-Based Auto-tuning of MapReduce, Aug. 2013, Retrieved Sep. 15, 2020, 11 Pgs.

\* cited by examiner

Ticketing System Data Store 300

| Identifier 302 | Timestamp 304 | Computing Device 306 | Event 308 |
|---|---|---|---|
| 100 | 00:30 | A123 | Update Firmware |
| 101 | 02:02 | B456 | Hardware provision (memory) |
| 102 | 02:31 | A123 | Update Operating System |

FIG. 3

| Identifier 402 | Computing Device 404 | Processor 406 | Throughput 408 | Security 410 | Application A 412 |
|---|---|---|---|---|---|
| 100 | A123 | Single Core | 32GB | Compliant | True |
| 101 | B456 | Dual Core | 54GB | Mostly Compliant | True |
| 102 | C789 | Quad Core | 16GB | Non-compliant | False |

Device Data Store 400

FIG. 4

COMPUTATIONAL CONFIGURATION AND MULTI-LAYER CLUSTER ANALYSIS

DESCRIPTION OF RELATED ART

Datacenter operators are responsible for configuring computing devices (e.g., an end user's laptop or personal device, or a server tuned for processing at the data center, etc.) to communicate via networks. Using their expertise and historical knowledge of the network, these datacenter operators attempt to figure out correct configurations for each computing device to satisfy different objectives of the datacenter. For example, one computing device may need to execute processes at an optimal speed, so the datacenter operator may add random access memory (RAM) or uninstall unnecessary software to configure the computing device to run faster. Another configuration may attempt to minimize cost of the computing device, because the computing device may be provided to several users for home use. In this instance, the datacenter operator may install a bare set of software programs and increase security protections to keep the device secure while working outside the network. Each of these situations illustrate different configuration parameters for optimizing the computing devices for a particular purpose. Deciding which of these optimizations to implement is a difficult and often inefficient task when expanded to more computing devices in the network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates sample data in a ticketing system data store, in accordance with embodiments of the application.

FIG. 4 illustrates sample data in a device data store, in accordance with embodiments of the application.

Figure 1:
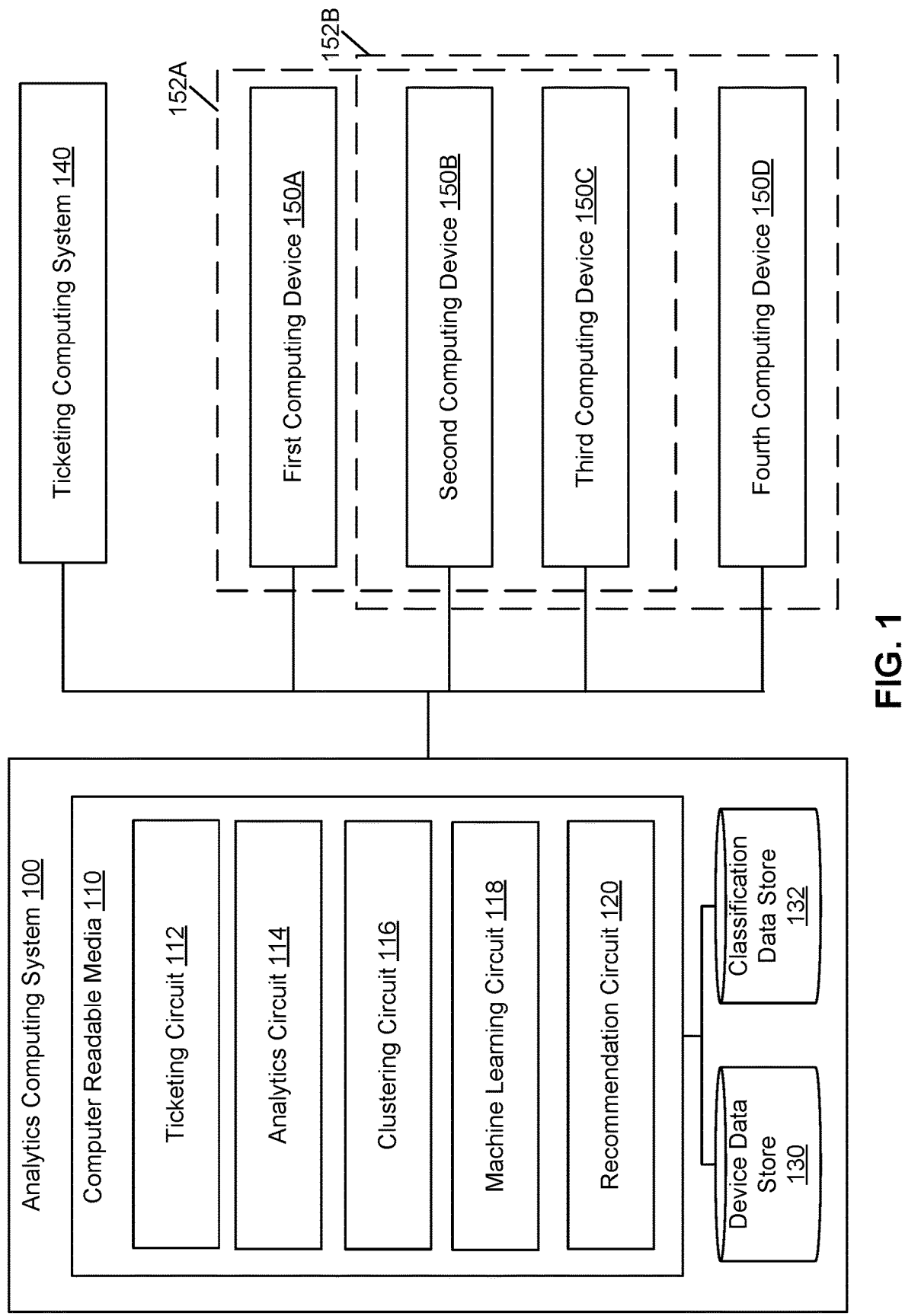
FIG. 1 provides illustrations of an analytics computing system, ticketing computing system, and computing devices, in accordance with embodiments of the application.

The figures are not exhaustive and do not limit the present disclosure to the precise form disclosed.

DETAILED DESCRIPTION

In some networks, computing devices are grouped into clusters and each of the computing devices in a cluster have shared configuration parameters. For example, as illustrated herein, when a particular build of computing device is provided to several users for home use, the datacenter operator may install a bare set of software programs and increase security protections to keep the device secure while working outside the network on each of the computing devices in the cluster.

Even with a consistent set of configuration parameters, determining which configuration parameters to implement on the cluster of computing devices is difficult to figure out. Additionally, maintaining the configuration parameters across all computing devices is especially difficult. For example, once the datacenter operator decides which components and versions to deploy on each computing device in the cluster, the computing device may be constantly updated with new software releases, user roles may be assigned and changed within each system, services across the cluster may be configured, and ongoing diagnostics may be performed to optimize cluster performance. These configuration parameters (e.g., hardware components, software installed, firmware version, user roles, throughput, utilization, etc.) are often updated by modifying service installations and continuously ensuring that all the computing devices in a cluster are correctly and consistently configured.

This may especially be true in the case where the clusters of similar type and functionality belong to different entities. Often times, datacenter operators are left with the problem of figuring out the right configurations for each cluster type to satisfy different objectives. These objectives might include optimal performance, minimum cost, efficient use of resources, less downtime, secure operation of the clusters, etc. For any given "type" of cluster, there are hundreds to thousands of configuration options, configuring both hardware and software parameters. It may be impossible to figure out the right configuration manually. The methods and techniques presented herein can help provide an automated way to recommend configuration options for clusters of computing devices to a large scale infrastructure provider (e.g., one thousand or more servers, etc.). In some examples, the recommendations may be identified using machine learning techniques.

Embodiments described herein can identify multiple layers of clusters of devices (e.g., shared hardware configuration, shared application configuration, number of applications, etc.) in a large scale infrastructure environment automatically. For each layer of the clusters of devices, parameters of these devices are provided to a machine learning model to produce an objective function (e.g., minimum number of devices, utilization under 80%, etc.), whose output can be provided to a datacenter operator or other user in the large scale infrastructure environment so they can make further configuration changes to the devices in each cluster.

Embodiments of the application may be distinguished from a digital twin system. For example, in a digital twin system, a similar computing device may be built in order for two computing devices to comprise similar components and parameters. The digital twin system may replicate computing devices. In this system, the components and parameters may be pre-existing and analyzed. The system may observe multiple environments of similar types and learn which environments behave the best in association with a particular objective function. As an illustrative example, two environments A1 and A2 provide similar throughput values. Embodiments of the application may determine the similarities and differences in configuration parameters between various computing devices in each environment and determine which configuration parameter (or set of configuration parameters) makes A1 perform better than A2 or vice versa.

Embodiments of the application may be distinguished from auto-tuner systems as well. For example, the goal of auto-tuners may be to tune the parameters based on an objective function. Most of these techniques are based on cost-based optimization and a deep knowledge of system internals and domain expertise required to pick the configuration parameters for the computing device. The difference between an auto-tuner and some embodiments of the application is that the process may not attempt to tune configuration parameters for the computing device to find the best results. This may turn out to be a hard problem, especially without domain knowledge of the specific application framework. Rather, embodiments of the application may classify the environments based on observed and/or collected data into "ranges" of objective functions. The system may then find the relevant features that have caused the environments to belong to that category. This may enable a reduced parameter space for the machine learning training phase and the ability to define objective functions that are not just performance metrics (e.g., number of support tickets).

Embodiments of the application may be differentiated on merely picking the best configuration from a set of all configurations available. For example, the system may first narrow down the available configuration space by grouping different environments based on similarity. This may help optimize the selection of the best configuration available. The system may also, in some examples, convert objective function values to range based labels, which may differ from standard objective functions.

Embodiments of the application also help may reduce dimensions in iterations during the machine learning training phase. For example, the parameter space may be limited to the hundreds to thousands, not millions. In some examples, parameters may be pruned iteratively and/or by using techniques like principle component analysis (PCA) to remove features that are least impactful on the objective function. In some examples, the process may start with third party provided reference configurations as input. This may help add a domain specific input to reduce parameter space, which may be similar to some auto-tuner techniques. For example, once the configuration parameters are received and analyzed, other parameters can be analyzed for impact on objective function in a dual-step analysis process of configuration parameters.

Technical advantages are realized throughout the application. For example, an objective function may be defined in addition to defining multiple layers of clusters of devices. Other systems appear to merely monitor sets of computing devices or clusters. This dynamic definition of the clusters of computing devices may help identify a configuration parameter change made to any of the devices in the environment and any affect that the changed configuration parameter has on the cluster of computing devices.

Additionally, the identification of a changed configuration parameter may be performed in near real time by monitoring a ticketing system associated with these devices. The ticketing system may track any event or interaction with each device in the entire system. These tickets may include, for example, a type of issue, what action was performed, criticality of a parameter, etc. This may trigger a data collection process that identifies changes to throughput, efficiency, utilization, etc. that have been altered based on that configuration change, since the data collection process is performed in near real time and can be attributed to the configuration change. When expanded system-wide, embodiments of the application can predict that the results from the configuration change to one device will be the same when implemented with similar devices in the specific layer of cluster.

FIG. 1 provides illustrations of an analytics computing system, ticketing computing system, and computing devices, in accordance with embodiments of the application. In FIG. 1, analytics computing system 100 is a specialized computing system that comprises computer readable media 110 in communication with one or more data stores, including device data store 130 and classification data store 132. Computer readable media 110 may comprise one or more circuits, including ticketing circuit 112, analytics circuit 114, clustering circuit 116, machine learning circuit 118, and recommendations circuit 120.

Analytics computing system 100 may comprise one or more hardware processors (not shown) and machine-readable computer readable media 110. Hardware processor may be one or more central processing units (CPUs), semiconductor-based microprocessors, and/or other hardware devices suitable for retrieval and execution of instructions stored in computer readable media 110. Hardware processor may fetch, decode, and execute instructions, to control processes or operations for determining a computational configuration and performing multi-layer cluster analysis. As an alternative or in addition to retrieving and executing instructions, hardware processor may include one or more electronic circuits that include electronic components for performing the functionality of one or more instructions, such as a field programmable gate array (FPGA), application specific integrated circuit (ASIC), or other electronic circuits.

Computer readable media 110 may comprise any electronic, magnetic, optical, or other physical storage device that contains or stores executable instructions. Thus, computer readable media 110 may be, for example, Random Access Memory (RAM), non-volatile RAM (NVRAM), an Electrically Erasable Programmable Read-Only Memory (EEPROM), a storage device, an optical disc, and the like. In some embodiments, computer readable media 110 may be a non-transitory storage medium, where the term "non-transitory" does not encompass transitory propagating signals.

Ticketing circuit 112 may be configured to identify one or more actions or computational events performed in a network. For example, ticketing computing system 140 may track one or more events in a computer network, including any interactions with configuration parameters of computing devices 150 (e.g., accessing, adjusting, deleting, etc.). With each event, a ticket may be generated and stored with ticketing system database at ticketing computing system 140 or as illustrated in FIG. 3.

Ticketing circuit 112 may be configured to identify both hardware and software changes to configuration parameters corresponding to the computing device. For example, the changes to configuration parameters may include an installation of hardware, reconfiguration of user roles or other parameters, increase or decrease of throughput by the computing device, change in utilization of the computing device by other computing devices on the network, and the like.

Ticketing circuit 112 may be configured to identify a number of tickets corresponding with a criticality of the interaction or event. For example, when the number of tickets received by ticketing circuit 112 exceeds a high criticality ticket threshold, the system may initiate the machine learning process (by machine learning circuit 118) to determine a recommendation (by recommendations circuit 120) triggered by the number of tickets and the high criticality ticket threshold. In some examples, the type, number, and/or criticality of the tickets received by ticketing circuit 112 may be used in triggering the recommendation.

Analytics circuit 114 may be configured to determine a set of measurement units of the computing device. The set of measurement units may be determined in near real time to attribute the change to the configuration parameter to the set of measurement units of the computing device. In some examples, the set of measurement units may include metrics, including Central Processing Unit (CPU) usage, a memory usage, or a network usage of the computing device.

As an illustrative example of measurement units, at time 00:00 a utilization may be 95% and at time 00:10 a configuration parameter is changed. At time 00:11 (e.g., real time or near real time) a ticket may be generated by ticketing computing system 140 and received by ticketing circuit 112 that identifies the utilization for computing device has changed to 80%. The drop in utilization from 95% to 80% may be attributed to the changed configuration parameter, due to the correlation of the timing of the configuration parameter change and the change in utilization rate.

In some examples, the time threshold is near real time to attribute the change to the configuration parameter to the set of measurement units of the computing device without other causes. Continuing the illustration, at time 00:00 a utilization may be 95% and at time 00:10 a configuration parameter is changed. At time 00:11 (e.g., real time or near real time) analytics circuit 114 may attribute the drop in utilization rate with the changing configuration parameter. However, when considering the time threshold, the assumed correlation between the event identified in the ticket and the changed measurement unit may be too attenuated. Analytics circuit 114 may determine other factors may have affected the changed measurement unit other than the configuration parameter. For example, if a ticket is generated at 00:20 and a second measurement unit has changed, the changed configuration parameter may not be correlated with this changed measurement unit due to the timing lapsed between the action and the measurement (00:10 to 00:20 compared to 00:10 to 00:11).

Clustering circuit 116 may be configured to receive information corresponding with one or more computing devices 150 and determine one or more clusters 152. Computing devices in each cluster 152 may be grouped based on one or more shared configuration parameters.

In some examples, a similarity score may be calculated for each cluster. The computing devices may be grouped based on cluster type, workload characterization (e.g., an aggregate of total memory usage of the cluster, normalized CPU utilization per node/core, total network usage, etc.). Computing devices running similar workloads can be grouped as similar clusters. In another example, computing devices may form a cluster based on the CPU, memory and network usage of the cluster, and the type of the cluster. Clusters of multiple customers whose similarity scores are within a threshold of each other are grouped together and considered/analyzed together.

In some examples, the similarity scores may be dependent on the objective function. For example, when the objective function is to minimize utilization, the similarity score may be used to identify clusters running similar workloads. If minimizing support tickets is the objective function, then the corresponding similarity score may be used. This may include a number of support tickets on a specific hardware or a software cluster type. Weights associated with the similarity scores may come into play if multiple objective functions are to be analyzed. Clustering circuit 116 may be configured to weigh multiple similarity scores to further narrow the number of clusters to compare or analyze.

Machine learning circuit 118 may be configured to determine a classification category for a set of objective functions and an associated score. The classification category may be selected from a plurality of classification categories (e.g., objective function 1, 2, etc.) and determining the classification category and the associated score comprises applying the set of measurement units of the first computing device to a trained machine-learning (ML) model.

The objective function can be defined as the metric that needs to be maximized or minimized. For instance, minimizing idle resources in a system, minimizing the support tickets/outages in a cluster, or maximizing performance metrics like throughput of the cluster. The objective function may be viewed as the label or category that is being predicted. Illustrative objective functions may include, for example, a CPU "busy" time that is greater than 95% is overutilized, or 80-95% is optimal, or anything less than 80% is under-utilized. Any of these classification categories may correspond with one or more computing issues that decrease usability of the cluster of computing devices.

This range of values corresponding with the objective function can be extended to other resources as well, including network and memory, or to objective functions other than performance metrics. For instance, security compliance can be a metric of interest and each cluster/node can be labeled "totally compliant," "mostly compliant," or "significantly non-compliant." This can also be used for application metrics, including minimizing the total execution time of a Spark® application. By converting metrics to range based labels or categories, the objective functions may be reduced to a "manageable" number of dimensions that are able to run more efficiently and in a shorter timeframe.

The input features may include each of the hardware and software configuration parameter. For example, the hardware related configuration parameters can include the number of CPUs, memory available, firmware versions of different pieces of hardware, BIOS settings, etc. Software configuration settings can include versions of software frameworks and runtime libraries that are installed in each of the nodes.

In addition to configuration parameters, machine learning circuit 118 may use resource utilization data (e.g., workload characterization, etc.) as part of the feature set for the ML model. The resource utilization may include a steady-state utilization. In some examples, machine learning circuit 118 may alter the resource utilization data to remove any spikes in performance (e.g., by applying a computation to average the data, etc.). This may help generate input to create a recommended configuration to meet the objective function in a cluster of computing devices over a given period of time.

Machine learning circuit 118 may be configured to use the trained ML model to fit the cluster data to predict the performance of other computing devices. The fitting can be done in multiple ways. For example, machine learning circuit 118 may directly fit the trained model to the test cluster data and predict the objective function label or category. In another example, machine learning circuit 118 may use the pruned training dataset in an unsupervised learning algorithm like KMeans clustering or a supervised learning algorithm like K-Nearest Neighbors to determine the closest objective function label or category.

Machine learning circuit 118 may also be configured to use the trained ML model to recommend a configuration parameter for a particular objective function. The problem can be formulated as, for example, given a particular cluster category with a certain type of workload, find the recommended configuration. In order to do that, after the training phase is complete, the closest configuration setting that would meet the objective function will be recommended for the cluster.

Recommendations circuit 120 may be configured to provide the recommended configuration to an interface. For example, upon determining that the associated score of a particular classification category exceeds a score threshold, recommendations circuit 120 may provide information associated with the classification category to an entity associated with a second computing device in the cluster of computing devices in the set of computing devices.

In some examples, the recommendation may be to revert to a configuration setting that was implemented prior to the timestamp identified with the ticket. This may include, for example, uninstall a recent software upgrade or revert to an earlier version of the software. In some examples, the recommendation may be to mirror a configuration setting of another cluster of computing devices. This may include, for example, upgrade to a newer version of the software or install more RAM. In some examples, the recommendation may be a statement of fact. This may include, for example, the throughput dropped from 90 mbps to 70 mbps after the firmware was installed.

In some examples, multiple objective functions may be implemented by the ML model and a corresponding recommendation may be provided for each objective function. This may result in multiple recommendations being provided to the interface. In some examples, a single, optimal recommendation may be provided that satisfies each of the objective functions.

Device data store 130 may comprise information associated with one or more computing devices in a network. Data stored in device data store 130 may be actively transmitted to analysis computing system 100 from each computing device 150 or passively obtained from each computing device 150 (e.g., through a secured connection or administrative permissions to access data). Additional detail regarding device data store 130 are illustrated with FIG. 4.

Multiple configuration parameters may define each computing device. The sheer number of configuration settings on an any given computing device makes it difficult to adjust configuration parameters to meet the objective functions (e.g., utilization under 80%, etc.). While there can be thousands of configuration settings that are available to be tuned, not all of them have equal impact on the objective function. For instance, the version of Java® running on the node will not impact performance if the node is running a Python® web application. While on the other hand, the number of cores available on the computing device is a common parameter in determining the performance of "any" application. Similarly, the firmware version running on a disk array controller may be an important configuration parameter that could impact the number of outages that happen in the cluster of computing devices.

Classification data store 132 may comprise one or more classification categories. A classification category may correspond with a set of configuration parameters and an expected measurement unit associated with that configuration setting.

Analytics computing system 100 may be in communication with ticketing computing system 140. Ticketing computing system 140 may comprise one or more computing devices that track events in a computer network (e.g., interactions with each computing device, an electronic communication transmitted, etc.) and generates a ticket for each event. An illustrative ticketing system data store is provided in FIG. 3. Data generated by ticketing computing system 140 may be transmitted in an electronic communication, or ticket, to ticketing circuit 112 via a communication network.

The one or more actions captured by ticketing computing system 140 may include a change to a configuration parameter of a device characteristic corresponding with a computing device 150 in a set of computing devices. The device characteristic may include a hardware or software characteristic of the computing device 150 and may include any measurable property of computing device 150 measured under specified conditions. In some examples, the ticket identifies a type of issue, what action was performed, or a criticality of the configuration parameter. For illustrative purposes, sample device characteristics are illustrated and described in relation to FIG. 4.

Analytics computing system 100 may be in communication one or more computing devices 150 (illustrated as first computing device 150A, second computing device 150B, third computing device 150C, and forth computing device 150D) that are grouped in one or more clusters 152 (illustrated as first cluster 152A and second cluster 152B). For example, first cluster 152A comprises first computing device 150A, second computing device 150B, and third computing device 150C and second cluster 152B comprises second computing device 150B, third computing device 150C, and forth computing device 150D. More or fewer clusters than two may be implemented in the system without diverting from the essence of the disclosure.

Clusters 152 may comprise small-scale or large-scale clusters, which may not be tightly controlled appliances where manual configuration is nearly impossible. In some examples, computing devices 150 in clusters 152 may be updated through recommendations provided via electronic notification to entities external to analytics computing system 100.

Clusters 152 may comprise physical or virtual computing devices 150 as nodes. Clusters 152 could run a single framework (e.g., a physical cluster of servers running Spark®) or may be hosting multiple frameworks (e.g., a virtualized/containerized environment running multiple big-data frameworks). The nodes may be interconnected by network switches and network links. Some clusters may comprise multiple servers running general purpose applications like web servers or database systems. In some cases, a single node can be considered a cluster and can be compared with similar single node clusters.

The clusters can be classified into different types. For example, a first cluster may be based on a number of criteria, including the type of framework that the cluster is running and/or the type of workload that the cluster is running (e.g., CPU intensive compute nodes or a storage intensive object store).

Figure 2:
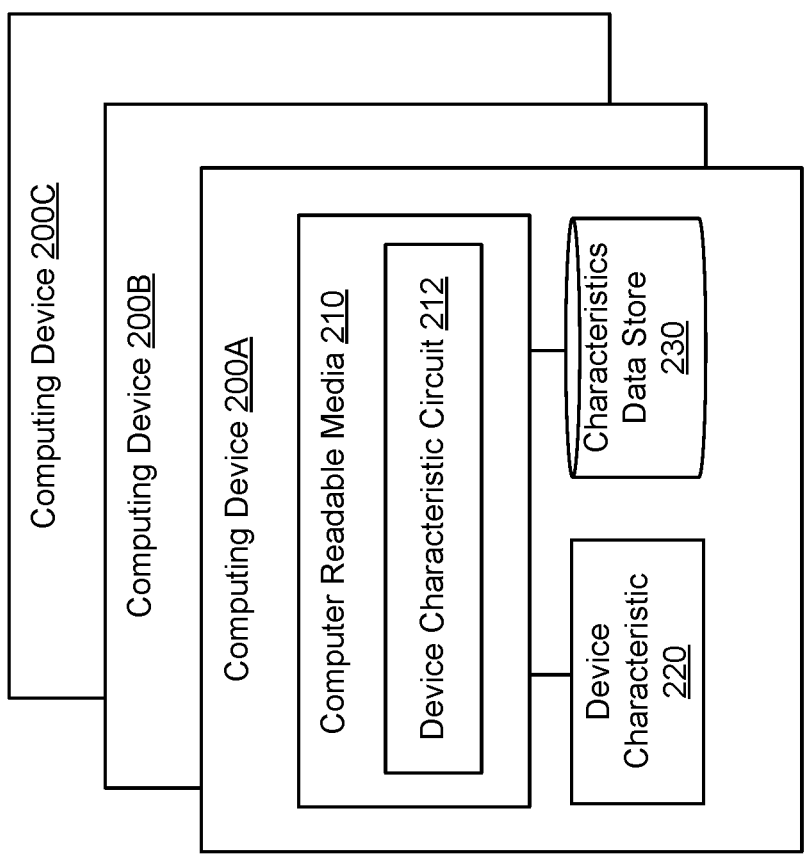
FIG. 2 illustrates the components of a computing device, in accordance with embodiments of the application.

Computing device 150 may comprise physical or virtual hardware computers, servers, or other computing devices, as illustrated in FIG. 2. FIG. 2 illustrates the components of a computing device 200, in accordance with embodiments of the application. Computing device 200 (illustrated as first computing device 200A, second computing device 200B, third computing device 200C) comprises computer readable media 210 in communication with one or more data stores, including characteristics data store 230. Computer readable media 210 may comprise one or more circuits, including device characteristic circuit 212. Computing device may also comprise device characteristic 220.

Computing device 200 may comprise one or more hardware processors and machine-readable computer readable media 210. These components may be similar to one or more hardware processors and computer readable media 110, as illustrated in FIG. 1.

Device characteristic circuit 212 may locally scan computing device 200 to determine one or more device characteristics 220. Device characteristic 220 may describe an aspect of the computing device. For example, each computing device has a set of hardware and software configurations. The hardware configurations may include type and number of processors, total memory available, network configuration, BIOS versions, etc. The software configurations may include Operating System type and version, different versions of runtime libraries, software frameworks, etc. Each of these device characteristics 220 may be stored locally at computing device 200 in characteristics data store 230. In some examples, when the computing device is running a Linux operating system, a user of the computing device may access at least some of this information from the proc file system "procfs" and/or "sysconfig."

The device characteristics stored with characteristics data store 230 can be collected from every node in the cluster and can be uniquely associated with the specific cluster and the node. Performance metrics may also be collected from each computing device where applicable. In the aggregate, these device characteristics may be collected from multiple environments and stored in a data store associated with analytics computing system 100 in FIG. 1.

FIG. 3 illustrates sample data in a ticketing system data store, in accordance with embodiments of the application. Ticketing system data store 300 may comprise identifier 302, timestamp 304, computing device 306, event 308, and any other relevant information associated with ticketing computing system 140 as illustrated in FIG. 1.

For example, a first ticket (identifier 100) may correspond with a first timestamp (00:30), a first computing device (A123), and an event (update firmware of the first computing device). A second ticket (identifier 101) may correspond with a second timestamp (02:02), a second computing device (B456), and an event (hardware provision, memory, for second computing device). A third ticket (identifier 102) may correspond with a third timestamp (02:31), the first computing device (A123), and an event (update operating system for the first computing device).

In some examples, a criticality of a ticket may be stored. For example, the event may correspond with a predetermined list of events. When the event identified by the ticket matches the list of predetermined events, the criticality of the ticket may be correlated with a predetermined list. This may include, for example, high, medium, and low criticality (or red, yellow, green, or score ranges like 8-10, 5-7, and 1-4, etc.). In some examples, this may include any changes to system parameters or security functions being high criticality, new hardware being installed as medium criticality, and any other interactions with the computing device being low criticality.

FIG. 4 illustrates sample data in a device data store, in accordance with embodiments of the application. Device data store 400 may comprise identifier 402, computing device 404, processor 406, throughput 408, security 410, application 412, and any other relevant information associated with one or more computing devices 150 as illustrated in FIG. 1.

For example, first device data (identifier 100) may correspond with the first computing device (A123), type of processor (single core), throughput (32 GB), security (compliant), and whether the computing device has Application A installed (true). Second device data (identifier 101) may correspond with the second computing device (B456), type of processor (dual core), throughput (54 GB), security (mostly compliant), and whether the computing device has Application A installed (true). Third device data (identifier 102) may correspond with a third computing device (C789), type of processor (quad core), throughput (16 GB), security (non-compliant), and whether the computing device has Application A installed (false).

Figure 5:
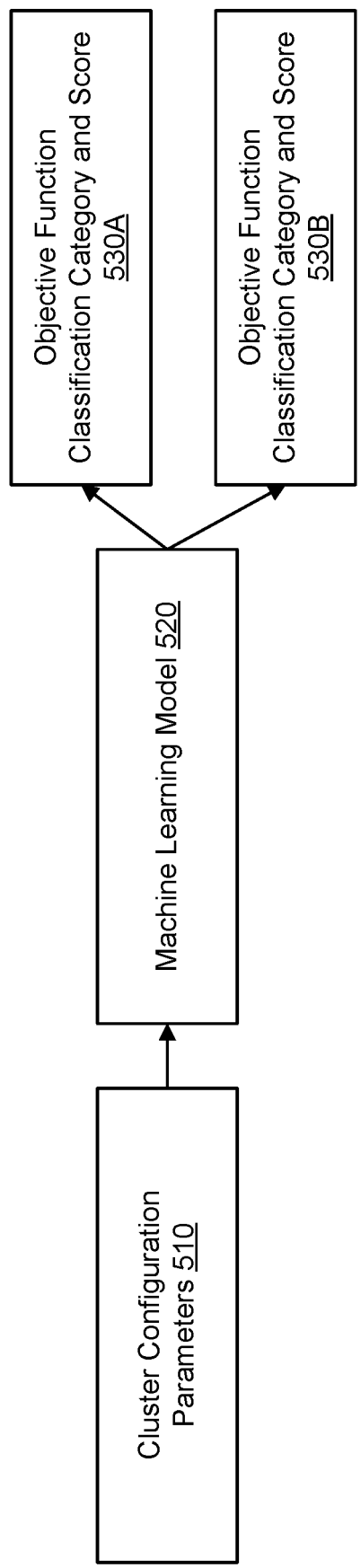
FIG. 5 provides a process of generating one or more objective functions, in accordance with embodiments of the application.

FIG. 5 provides a process of generating one or more objective functions, in accordance with embodiments of the application. The process may comprise cluster configuration parameters 510, machine learning model 520, and one or more objective functions including a classification category and score 530 (illustrated as first objective function including a classification category and score 530A and second objective function including a classification category and score 530B).

In 510, configuration parameters may be associated with one or more clusters. In some examples, the computing devices associated with a first cluster may include some computing devices that are also associated with a second cluster. Each of these clusters may comprise a unique set of configuration parameters.

In 520, a machine learning model may be trained and implemented to determine one or more classification categories and a corresponding score. A supervised learning model may be implemented. As described herein, the labels or categories for the supervised learning model are the objective functions. During the training phase, the machine learning model may obtain appropriate weights to each of the features and prune any configuration parameters that are determined to have the least impact on the label or category classification.

In some examples, the ML model may correspond with configuration parameters with close to zero weights are pruned during each training phase. This may help reduce dimensionality significantly.

In some examples, a non-parametric technique like Principal Component Analysis (PCA) or Singular Value Decomposition (SVD) can be used to reduce dimensionality. In these implementations, the system may remove features that are least impactful on the objective function.

In some examples, publicly available configuration setting recommendations may be used to help train the ML model. For example, the configuration settings may be provided by infrastructure software providers like Cloudera® or BlueData EPIC®. The configuration settings may be selected as features.

In some examples, the ML model may implement a multi-label or category classifier. This may help address the case where multiple objective functions can be satisfied simultaneously.

In 530, the trained ML model may determine a classification category for a set of objective functions and an associated score. The classification category may be selected from a plurality of classification categories. The determination of the classification category and the associated score may comprise applying the set of measurement units of the computing device to a trained machine-learning (ML) model.

The trained ML model may be configured to fit the cluster data to predict the performance of other computing devices. The fitting can be done in multiple ways. For example, a direct fit of the trained model to the test cluster data may be used to predict the objective function label or category. In another example, a pruned training dataset may be used in an unsupervised learning algorithm like KMeans clustering or a supervised learning algorithm like K-Nearest Neighbors to determine the closest objective function label or category.

Figure 6:
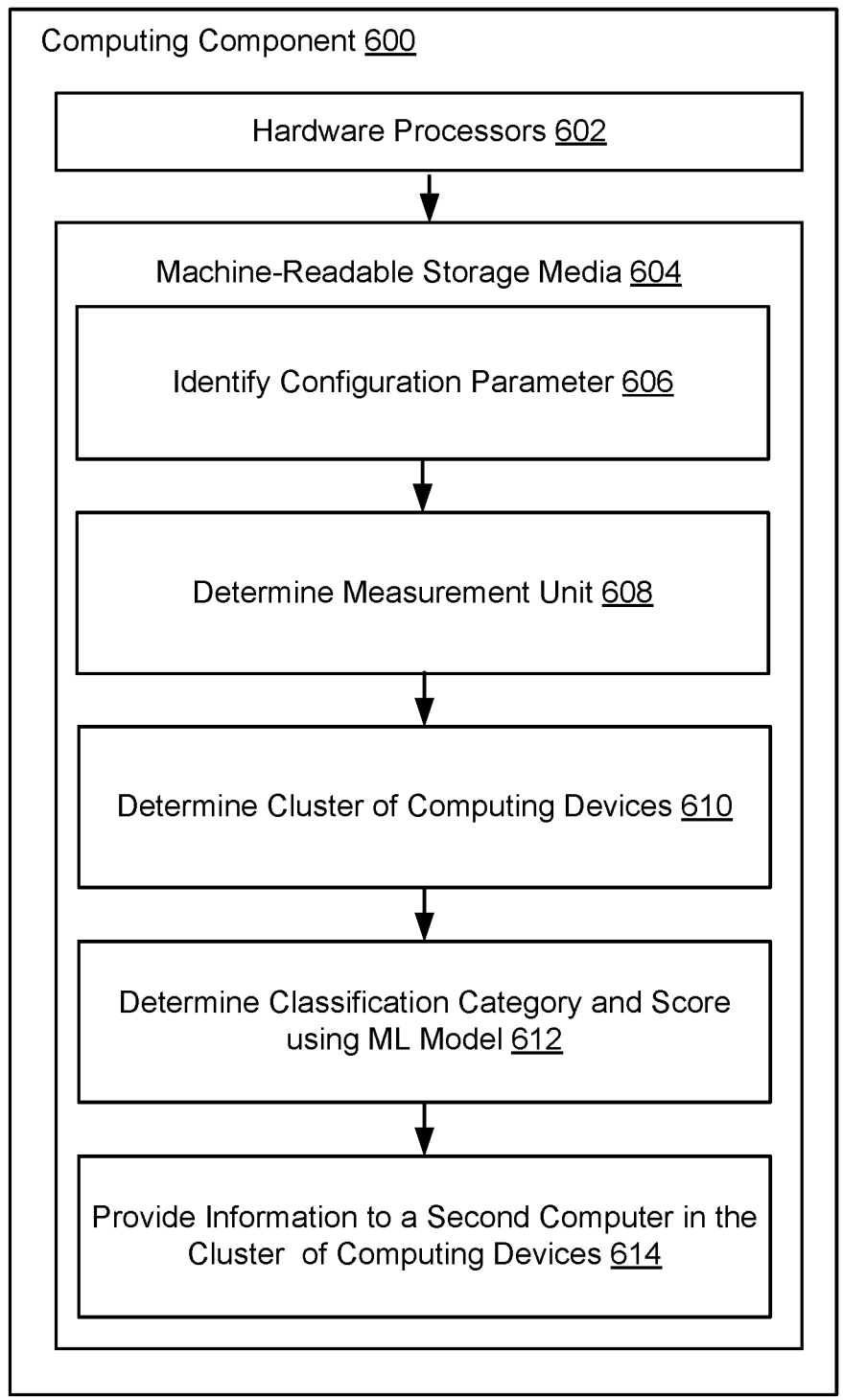
FIG. 6 illustrates a computing component for computational configuration and multi-layer cluster analysis, in accordance with embodiments of the application.

FIG. 6 illustrates an example iterative process performed by a computing component for computational configuration and multi-layer cluster analysis. Computing component 600 may be, for example, a server computer, a controller, or any other similar computing component capable of processing data. In the example implementation of FIG. 6, the computing component 600 includes a hardware processor 602, and machine-readable storage medium 604. In some embodiments, computing component 600 may be an embodiment of analysis computing system 100 of FIG. 1.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for optimizing the system during run-time. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to identify a configuration parameter. For example, the configuration parameter may correspond with a device characteristic. The configuration parameter may correspond to a first computing device in a set of computing devices. In some examples, the identification of the configuration parameter may correspond with a change to the configuration parameter.

Hardware processor 602 may execute instruction 608 to determine a set of measurement units of the first computing device in the set of computing devices. The set of measurement units may be determined within a time threshold of identifying the change to the configuration parameter.

Hardware processor 602 may execute instruction 610 to determine a cluster of computing devices in the set of computing devices. For example, the cluster of computing devices may share the device characteristic with the first computing device in the set of computing devices.

Hardware processor 602 may execute instruction 612 to determine a classification category and score using a machine learning (ML) model. The classification category may correspond with a set of objective functions and an associated score. The classification category may be selected from a plurality of classification categories. In some examples, determining the classification category and the associated score comprises applying the set of measurement units of the first computing device to a trained machine-learning (ML) model.

Hardware processor 602 may execute instruction 614 to provide information to a second computer in the cluster of computing devices. For example, the information may be associated with the classification category for the set of objective functions. The second computer may correspond to a particular entity. In some examples, the information may be provided upon determining that the associated score of a particular classification category exceeds a score threshold.

In some examples, hardware processor 602 may execute an instruction to change to the configuration parameter. The change to the configuration parameter may be based on a ticket generated by a ticketing system. The ticket may identify a type of issue, what action was performed, or a criticality of the configuration parameter.

In some examples, the set of measurement units may comprise a Central Processing Unit (CPU) usage, a memory usage, or a network usage of the first computing device.

In some examples, the set of measurement units may be determined in near real time to attribute the change to the configuration parameter to the set of measurement units of the first computing device in the set of computing device.

In some examples, the time threshold is near real time to attribute the change to the configuration parameter to the set of measurement units of the first computing device in the set of computing devices without other causes.

In some examples, the plurality of classification categories correspond with computing issues that decrease usability of the cluster of computing devices.

Figure 7:
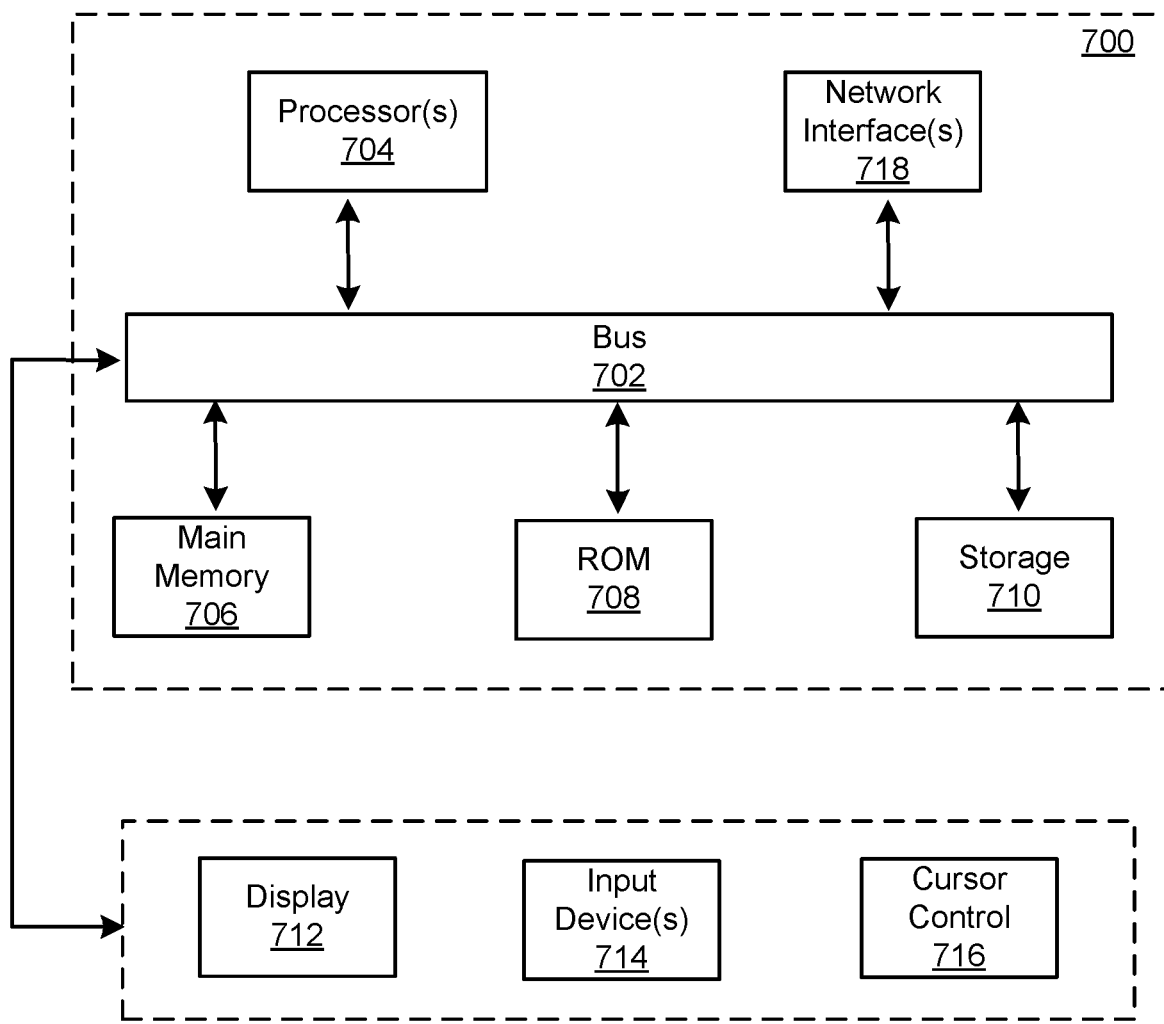
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 604 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 604. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 606 from another storage medium, such as storage device 710. Execution of the sequences of instructions contained in main memory 706 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 602. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
    identifying, by a computer system, a change to a configuration parameter of a device characteristic corresponding to a first computing device in a set of computing devices;
    within a time threshold of identifying the change to the configuration parameter, determining, by the computer system, a set of measurement units of the first computing device in the set of computing devices;
    determining, by the computer system, a cluster of computing devices in the set of computing devices, wherein the cluster of computing devices share the device characteristic with the first computing device in the set of computing devices;
    determining, by the computer system, a classification category for a set of objective functions and an associated score, wherein the classification category is selected from a plurality of classification categories, and wherein determining the classification category and the associated score comprises applying the set of measurement units of the first computing device to a trained machine-learning (ML) model; and
    upon determining that the associated score of a particular classification category exceeds a score threshold, providing, by the computer system, information associated with the classification category for the set of objective functions to an entity associated with a second computing device in the cluster of computing devices in the set of computing devices.

2. The computer-implemented method of claim 1, wherein the change to the configuration parameter is based on a ticket generated by a ticketing system, and wherein the ticket identifies a type of issue, what action was performed, or a criticality of the configuration parameter.

3. The computer-implemented method of claim 1, wherein the set of measurement units comprises a Central Processing Unit (CPU) usage, a memory usage, or a network usage of the first computing device.

4. The computer-implemented method of claim 1, wherein the set of measurement units are determined in near real time to attribute the change to the configuration parameter to the set of measurement units of the first computing device in the set of computing devices.

5. The computer-implemented method of claim 1, wherein the time threshold is near real time to attribute the change to the configuration parameter to the set of measurement units of the first computing device in the set of computing devices without other causes.

6. The computer-implemented method of claim 1, wherein the plurality of classification categories correspond with computing issues that decrease usability of the cluster of computing devices.

7. The computer-implemented method of claim 1, wherein the device characteristic is a hardware or software characteristic of the first computing device in the set of computing devices.

8. A system comprising:
    a memory; and
    one or more processors configured to execute machine readable instructions stored in the memory for performing the method comprising:
        identifying a change to a configuration parameter of a device characteristic corresponding to a first computing device in a set of computing devices;
        within a time threshold of identifying the change to the configuration parameter, determining a set of measurement units of the first computing device in the set of computing devices;
        determining a cluster of computing devices in the set of computing devices, wherein the cluster of computing devices share the device characteristic with the first computing device in the set of computing devices;
        determining a classification category for a set of objective functions and an associated score, wherein the classification category is selected from a plurality of classification categories, and wherein determining the classification category and the associated score comprises applying the set of measurement units of the first computing device to a trained machine-learning (ML) model; and upon determining that the associated score of a particular classification category exceeds a score threshold, providing information associated with the classification category for the set of objective functions to an entity associated with a second computing device in the cluster of computing devices in the set of computing devices.

9. The system of claim 8, wherein the change to the configuration parameter is based on a ticket generated by a ticketing system, and wherein the ticket identifies a type of issue, what action was performed, or a criticality of the configuration parameter.

10. The system of claim 8, wherein the set of measurement units comprises a Central Processing Unit (CPU) usage, a memory usage, or a network usage of the first computing device.

11. The system of claim 8, wherein the set of measurement units are determined in near real time to attribute the change to the configuration parameter to the set of measurement units of the first computing device in the set of computing devices.

12. The system of claim 8, wherein the time threshold is near real time to attribute the change to the configuration parameter to the set of measurement units of the first computing device in the set of computing devices without other causes.

13. The system of claim 8, wherein the plurality of classification categories correspond with computing issues that decrease usability of the cluster of computing devices.

14. The system of claim 8, wherein the device characteristic is a hardware or software characteristic of the first computing device in the set of computing devices.

15. A non-transitory computer-readable storage medium storing a plurality of instructions executable by one or more processors, the plurality of instructions when executed by the one or more processors cause the one or more processors to:

identify a change to a configuration parameter of a device characteristic corresponding to a first computing device in a set of computing devices;

within a time threshold of identifying the change to the configuration parameter, determine a set of measurement units of the first computing device in the set of computing devices;

determine a cluster of computing devices in the set of computing devices, wherein the cluster of computing devices share the device characteristic with the first computing device in the set of computing devices;

determine a classification category for a set of objective functions and an associated score, wherein the classification category is selected from a plurality of classification categories, and wherein determining the classification category and the associated score comprises applying the set of measurement units of the first computing device to a trained machine-learning (ML) model; and upon determining that the associated score of a particular classification category exceeds a score threshold, provide information associated with the classification category for the set of objective functions to an entity associated with a second computing device in the cluster of computing devices in the set of computing devices.

16. The non-transitory computer-readable storage medium of claim 15, wherein the change to the configuration parameter is based on a ticket generated by a ticketing system, and wherein the ticket identifies a type of issue, what action was performed, or a criticality of the configuration parameter.

17. The non-transitory computer-readable storage medium of claim 15, wherein the set of measurement units comprises a Central Processing Unit (CPU) usage, a memory usage, or a network usage of the first computing device.

18. The non-transitory computer-readable storage medium of claim 15, wherein the set of measurement units are determined in near real time to attribute the change to the configuration parameter to the set of measurement units of the first computing device in the set of computing devices.

19. The non-transitory computer-readable storage medium of claim 15, wherein the time threshold is near real time to attribute the change to the configuration parameter to the set of measurement units of the first computing device in the set of computing devices without other causes.

20. The non-transitory computer-readable storage medium of claim 15, wherein the plurality of classification categories correspond with computing issues that decrease usability of the cluster of computing devices.

* * * * *